United States Patent
Durant et al.

(10) Patent No.: US 7,910,677 B2
(45) Date of Patent: Mar. 22, 2011

(54) DETERGENTS CONTAINING POLYCARBOXYLIC ACID POLYMERS

(75) Inventors: Yvon Durant, Lee, NH (US); Ming Cao, Wilmington, MA (US); Mathieu Chirat, Durham, NH (US)

(73) Assignee: University of New Hampshire, Durham, NJ (US)

( * ) Notice: Subject to any disclaimer, the term of this patent is extended or adjusted under 35 U.S.C. 154(b) by 0 days.

(21) Appl. No.: 12/570,447

(22) Filed: Sep. 30, 2009

(65) Prior Publication Data

US 2010/0022436 A1   Jan. 28, 2010

Related U.S. Application Data

(62) Division of application No. 12/437,001, filed on May 7, 2009.

(60) Provisional application No. 61/127,941, filed on May 16, 2008.

(51) Int. Cl.
*C08F 22/02* (2006.01)
*C08F 20/20* (2006.01)
*C11D 3/20* (2006.01)
*C08G 63/16* (2006.01)
*C08L 31/00* (2006.01)

(52) U.S. Cl. ............. 526/318.2; 510/434; 526/318.43; 528/302; 524/556

(58) Field of Classification Search ............. 526/318.2, 526/318.43; 528/302; 510/434; 524/556
See application file for complete search history.

(56) References Cited

U.S. PATENT DOCUMENTS

| | | | | |
|---|---|---|---|---|
| 3,055,873 A | * | 9/1962 | Hull et al. | 525/355 |
| 3,390,351 A | * | 6/1968 | Bell | 372/103 |
| 3,940,351 A | * | 2/1976 | Schlatzer, Jr. | 524/795 |
| 5,223,592 A | * | 6/1993 | Hughes et al. | 526/240 |
| 5,336,744 A | * | 8/1994 | Swift et al. | 526/318.2 |
| 2007/0203280 A1 | | 8/2007 | Okochi | |

FOREIGN PATENT DOCUMENTS

WO   0002862   1/2000

OTHER PUBLICATIONS

Ming Cao, Yvon Durant "Polymerization of Poly(itaconic acid)", Nanostructures Polymer Research Center, University of New Hamshire, American Chemical Society, 2007.*
International Search Report and Written Opinion dated Nov. 24, 2009 issued in related International Patent Application No. PCT/US09/43128.
Office Action dated Jan. 25, 2010 issued in related U.S. Appl. No. 12/437,001.
Office Action dated May 27, 2010 issued in related U.S. Appl. No. 12/437,001.
Office Action dated Jan. 25, 2010 issued in related U.S. Appl. No. 12/570,521.
Notice of Allowance dated Dec. 15, 2010 issued in related U.S. Appl. No. 12/437,001.
Office Action dated Jul. 7, 2010 issued in related U.S. Appl. No. 12/570,521.

* cited by examiner

*Primary Examiner* — Michael M Bernshteyn
(74) *Attorney, Agent, or Firm* — Grossman, Tucker, Perreault & Pfleger, PLLC

(57) ABSTRACT

The present invention relates to methods and polymers based upon vinyl type monomers that contain pendant carboxylic acid groups and ester group functionality. The polymers may be prepared under selected conditions of partial neutralization to provide relatively high conversions and/or relatively high values of molecular weight and/or selected amounts of repeating unit tacticity. The polymers may then be used in detergent formulations.

32 Claims, 8 Drawing Sheets

DETERGENTS CONTAINING POLYCARBOXYLIC ACID POLYMERS

CROSS-REFERENCE TO RELATED APPLICATIONS

This application claims the benefit of U.S. Provisional Application No. 61/127,941 filed May 16, 2008. This application is also a divisional of U.S. application Ser. No. 12/437,001, filed May 7, 2009.

FIELD OF THE INVENTION

The present invention relates to preparation of polymers of vinyl type monomers that may contain pendant carboxylic acid groups and optionally ester type functionality. Such polymers may be prepared under selected conditions such that the parameters of, e.g., monomer conversion, acid functionality, molecular weight, tacticity and/or copolymer composition may be adjusted to selected levels for a selected application.

BACKGROUND

The polymerization of vinyl type monomers that contain pendant carboxylic acid functionality has always presented some unique challenges. For example, U.S. Pat. No. 5,223,592 reports that the critical aspect is to provide complete neutralization of an itaconic acid type monomer prior to conducting the polymerization reaction, where complete neutralization is identified as having two moles of base neutralizer for each mole of itaconic acid. U.S. Pat. No. 5,336,744 reports that polymers of itaconic acid are formed at high conversion by an aqueous polymerization process of partially neutralized monomer solution, water, polyvalent metal ion, and initiator.

SUMMARY

In a first example of the present disclosure, a method of forming a detergent comprises supplying polymerized monomer, wherein the polymerized monomer is sourced from a monomer having one or more of the following structures:

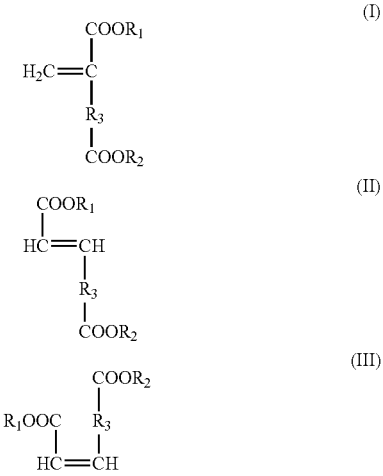

wherein $R_1$ and $R_2$ are selected from a hydrogen atom or an alkyl group (e.g. —$(C_nH_{2n+1})$ where n has a value of 1-18), or an aromatic group, or a cyclic alkyl group or a polyether, and combinations thereof. In addition, $R_3$ may be selected from an alkyl group, aromatic functionality, heteroaromatic functionality, cyclic alkyl group, heterocyclic group, or combinations thereof, wherein at least 50 mole % of $R_1$ and $R_2$ are a hydrogen atom to provide carboxylic acid functionality. This may then be followed by combining at least one of monomers (I), (II) and/or (III) with a solvent (which may include water) and partially neutralizing the carboxylic acid functionality at a level of 25.0 mole % to 85.0 mole % for each mole of carboxylic acid functionality present wherein such partial neutralization takes place over a time period not to exceed an accumulated time of 6.0 hours and at a temperature of 50.0° C. to 150° C. This may then be followed by polymerizing one of the monomers (I), (II) and/or (III) wherein the percent conversion of one of the monomers to polymer is at or above 50.0%. One of the polymerized monomers may then be used a component in a detergent.

In a second example of the present disclosure, a method of forming a detergent comprises supplying polymerized monomer, wherein the polymerized monomer is sourced from a monomer having the following structure:

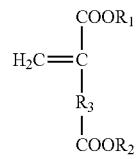

wherein $R_1$ and $R_2$ are selected from a hydrogen atom or an alkyl group (e.g. —$(C_nH_{2n+1})$ where n has a value of 1-18), or an aromatic group, or a cyclic alkyl group or a polyether, and combinations thereof. In addition, $R_3$ may be selected from an alkyl group, aromatic functionality, heteroaromatic functionality, cyclic alkyl group, heterocyclic group, or combinations thereof, wherein at least 50 mole % of $R_1$ and $R_2$ are a hydrogen atom to provide carboxylic acid functionality. The monomer may then be combined with a solvent followed by partially neutralizing the carboxylic acid functionality at a level of 25.0 mole % to 85.0 mole % for each mole of carboxylic acid functionality present. The partial neutralization may be configured to take place over a time period not to exceed 6.0 hours and at a temperature of 50.0° C. to 150° C. The polymerization of the monomer is conducted under circumstances where the percent conversion of one of the monomer to polymer is at or above 50.0%. The polymerized monomer is then combined as a component in a detergent formulation.

In a third example of the present disclosure, a detergent is provided including a polymer comprising one or more of the following structures:

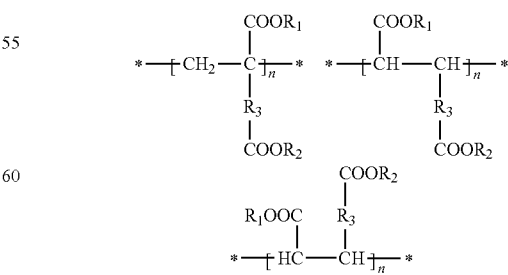

wherein $R_1$ and $R_2$ are selected from a hydrogen atom or an alkyl group (e.g. —$(C_nH_{2n+1})$ where n has a value of 1-18), or an aromatic group, or a cyclic alkyl group or a polyether, and combinations thereof. In addition, $R_3$ may be selected from an alkyl group, aromatic functionality, heteroaromatic functionality, cyclic alkyl group, heterocylic group, or combinations thereof, wherein at least 50 mole % of $R_1$ and $R_2$ are a hydrogen atom to provide carboxylic acid functionality. Any one of the polymer structures are such that the value of n for the indicated repeating unit provides a weight average molecular weight of at or above 20,000.

In a fourth example the present disclosure is directed at a detergent including a polymer material comprising one or more of the following repeating units:

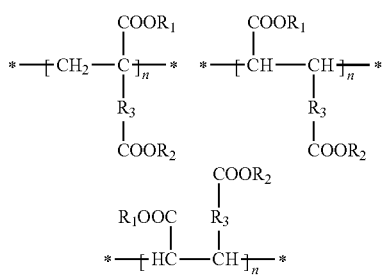

wherein $R_1$ and $R_2$ are selected from a hydrogen atom or an alkyl group or an aromatic group, or a cyclic alkyl group or a polyether, and combinations thereof and $R_3$ may be selected from an alkyl group, aromatic functionality, heteroaromatic functionality, cyclic alkyl group, heterocyclic group, or combinations thereof, wherein at least 50 mole % of $R_1$ and $R_2$ are a hydrogen atom to provide carboxylic acid functionality. The polymer material indicates $^{13}$C NMR triads having a syndiotacticity of greater than 58.0%.

BRIEF DESCRIPTION OF THE DRAWINGS

The above-mentioned and other features of this disclosure, and the manner of attaining them, will become more apparent and better understood by reference to the following description of embodiments described herein taken in conjunction with the accompanying drawings, wherein.

DETAILED DESCRIPTION

Figure 1:
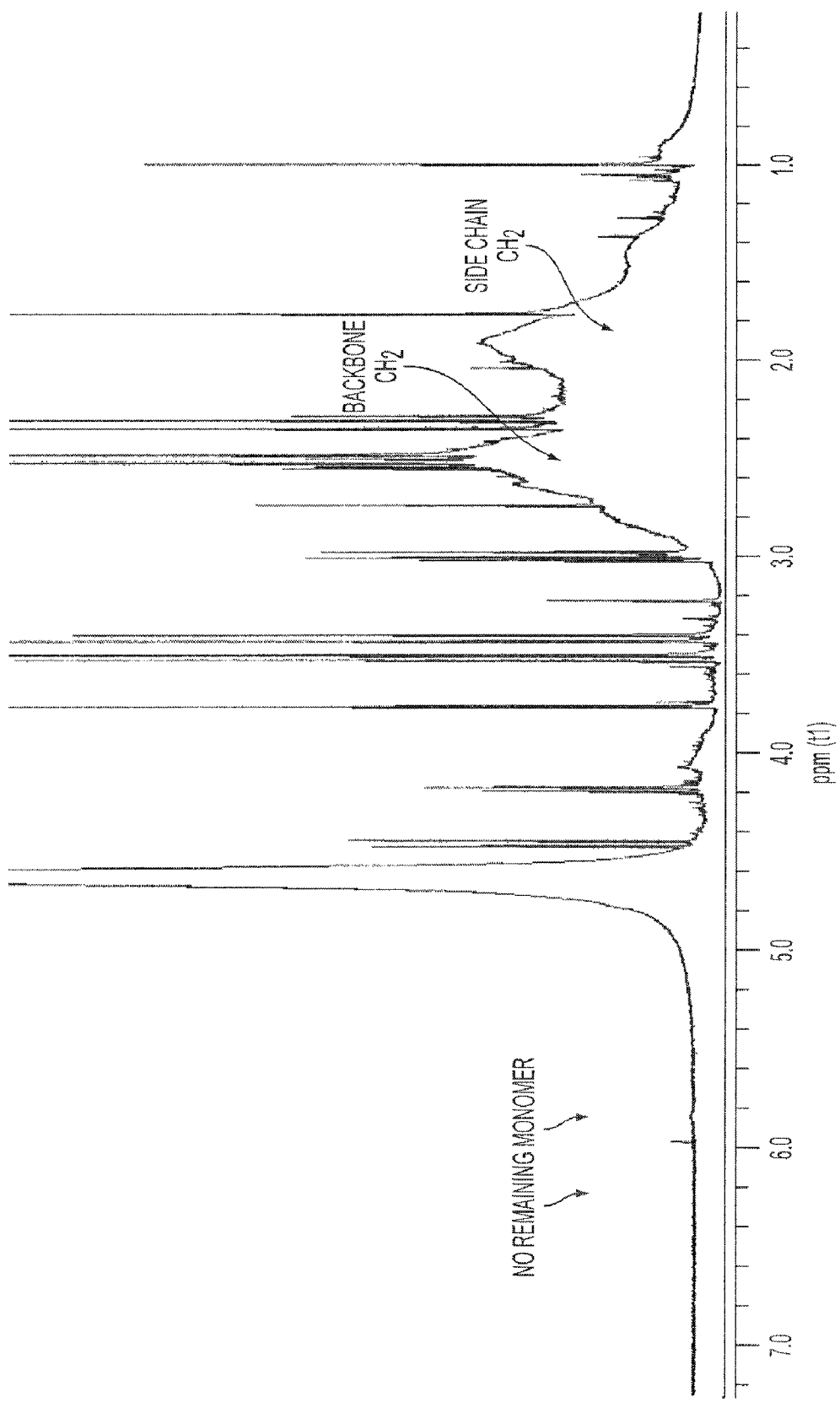
FIG. 1 shows the 400 MHz $^1$H NMR spectra of poly(itaconic acid) in $D_2O$ corresponding to Synthesis A.

Throughout the description, like reference numerals and letters indicate corresponding structure throughout the several views. Also, any particular feature(s) of a particular exemplary embodiment may be equally applied to any other exemplary embodiment(s) of this specification as suitable. In other words, features between the various exemplary embodiments described herein are interchangeable as suitable, and not exclusive. It may be appreciated that the present disclosure is not limited in its application to the details of construction and the arrangement of components set forth in the following description or illustrated in the drawings. The embodiments herein may be capable of other embodiments and of being practiced or of being carried out in various ways. Also, it may be appreciated that the phraseology and terminology used herein is for the purpose of description and should not be regarded as limiting. The use of "including," "comprising," or "having" and variations thereof herein is meant to encompass the items listed thereafter and equivalents thereof as well as additional items.

The monomers suitable for polymerization herein first include vinyl type monomers that have the following general structure:

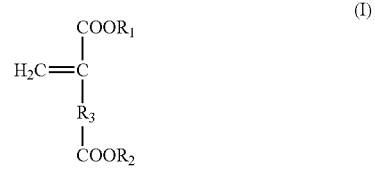

(I)

wherein $R_1$ and $R_2$ are selected from a hydrogen atom or an alkyl group (e.g. —($C_nH_{2n+1}$) where n has a value of 1-18), or an aromatic group, or a cyclic alkyl group or a polyether, and combinations thereof. In addition, $R_3$ may be selected from an alkyl group, aromatic functionality, heteroaromatic functionality, cyclic alkyl group, heterocyclic group, or combinations thereof, wherein at least 50 mole % of $R_1$ and $R_2$ are a hydrogen atom to provide carboxylic acid functionality. In addition, in a particularly preferred embodiment, R1 and R2 are both hydrogen atoms, which therefore provides the monomer generally known as itaconic acid.

An alkyl group may be understood to include combinations of carbon and hydrogen, including unsaturated carbon-carbon linkages, which are not prone to polymerization, such as radical polymerization. Furthermore, the number of carbon atoms in the alkyl group as alluded to above may be in the range of 1-18, including all values therein in 1 carbon increments. In addition, reference to heteroaromatic functionality may be understood as reference to an aromatic ring containing a heteroatom (e.g., nitrogen, oxygen, sulfur or phosphorous) and reference to a heterocyclic group may be understood as reference to a non-aromatic carbon ring structure also containing one or more heteroatoms.

Other monomers suitable for the present invention may also include the following related general structures:

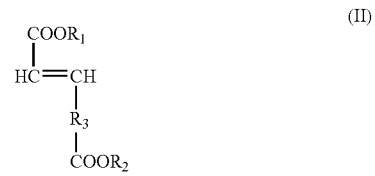

(II)

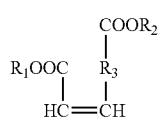

(III)

wherein $R_1$ and $R_2$ are selected from a hydrogen atom or an alkyl group (e.g. —$(C_nH_{2n+1})$ where n has a value of 1-18), or an aromatic group, or a cyclic alkyl group or a polyether, and combinations thereof. In addition, $R_3$ may be selected from an alkyl group, aromatic functionality, heteroaromatic functionality, cyclic alkyl group, heterocylic group, or combinations thereof, wherein at least 50 mole % of $R_1$ and $R_2$ are a hydrogen atom to provide carboxylic acid functionality. In addition, as disclosed above, at least 50 mole % of R1 and R2 are hydrogen atoms, and in a particular preferred embodiment, R1 and R2 both are hydrogen atoms.

Any of the above monomers may be present in the final polymer produced herein as pure homopolymeric resin. However, comonomers may also be employed in conjunction with the above monomeric compounds, which may then provide random copolymer structure. With respect to the use of the following comonomers it should be appreciated that the vinyl monomers noted above containing the indicated $R_1$, $R_2$ and $R_3$ functionality may be preferentially present at a level of equal to or greater than 50 wt. %. Accordingly, the comonomers that may then be utilized include any vinyl type monomer that would be suitable for copolymerization, including, but not limited to acrylate monomers (such as methyl methacrylate, methyl acrylate, 2-hydroxyethyl acrylate, polyethyleneoxidediacrylate), vinyl acetate, vinyl halides, styrene, acrylamides, olefin monomers (e.g. ethylene or propylene) and acrylonitrile. In addition, the comonomers may include vinyl type anhydride monomers, such as maleic acid anhydride, itaconic acid anhydride as well as other acidic functionalized monomers, such as citraconic acid or measaconic acid (however, as noted herein, the levels of these latter monomers may require selected control of the concentration in the polymerization medium). Comonomers may also extend to water soluble type monomers, such as vinyl alcohol or vinyl acetate-vinyl alcohol mixtures.

Furthermore, one may utilize multifunctional type vinyl monomers in the event that one desires to achieve some level of crosslinking. For example, one may preferably employs a multifunctional vinyl monomer, which may be understood as a monomer that provides two or more vinyl type groups suitable for chain-type addition polymerization. One example of such a difunctional monomer includes polyethyleneglycoldiacrylate (PEGDA) which may have the following structure:

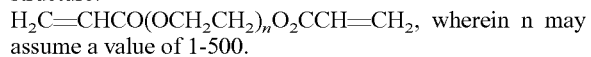
$H_2C$=$CHCO(OCH_2CH_2)_nO_2CCH$=$CH_2$, wherein n may assume a value of 1-500.

Neutralization

It has been found that to provide for relatively more efficient polymerization and in particular relatively high conversion (e.g. conversion of at or greater than 75% wt of the monomer) the monomers identified herein (I, II or III noted above) may preferably be first neutralized under selected conditions in order to optimize the ensuing polymerization which may then improve values of conversion and/or molecular weight. The molecular weights that are improved may include the number average molecular weight (Mn) and/or weight average molecular weight (Mw).

Neutralization may be accomplished by treatment of the acidic monomers with any base, such as monovalent inorganic bases, e.g., $M^+[OH^-]_x$ wherein M represents a cationic moiety selected from sodium, potassium, lithium and x assumes the value to provide a neutralized salt. In addition, it is contemplated herein that one may employ non-metallic hydroxides, such as ammonium hydroxide, as well as organic base compounds, including primary amines (e.g. an alkyl amine such as monomethyl amines, dimethylamines, trimethylamines, monoethylamine, diethylamine, triethylamine) and/or organic compounds containing hydroxyl (OH) group functionality (e.g. ethylene glycol).

The amount of neutralization may be adjusted to provide a less than complete neutralization of the acidic groups present on the vinyl monomers noted herein (again, I, II or III noted above). For example, in the case of the representative monomer of itaconic acid, it may be understood that complete neutralization will require two moles of neutralizer for each mole of itaconic acid. That is, two moles of sodium hydroxide would provide complete neutralization of one mole of itaconic acid, and any amount of sodium hydroxide less than two moles would provide the desired result of partial neutralization. Those of skill in the art would recognize that when a divalent based is employed to neutralize itaconic acid, the amount of divalent base selected to completely neutralize itaconic acid would be 1.0 mole of divalent base for each mole of itaconic acid, and to partially neutralize, less than one mole of divalent base may be applied to partially neutralize the itaconic acid monomer.

It has been found that the level of neutralization herein may be preferentially maintained at about 25.0 mole % to 85.0 mole %, including all values therein, in 1.0 mole % increments. For example, for a 1.0 moles of itaconic acid, one may preferably neutralize 0.25 moles of the acid groups present to 0.85 moles of the acid groups present. More preferably, the level of neutralization may be maintained at a level of 40.0 mole % to 60.0 mole %, and in a most preferred embodiment, the level of neutralization of the acid monomer selected may be in the range of 45.0 mole % to 55.0 mole %.

The temperature at which partial neutralization may be achieved may also be adjusted such that neutralization is accomplished at temperatures of 50.0° C. to 150° C., including all values therein, in 1.0° C. increments. For example, it is preferable that the neutralization temperature is adjusted to be 50° C. to 110° C., and in a most preferred configuration, the neutralization temperature is adjusted to be in the range of 65° C. to 100° C.

The time for neutralization has also emerged as another variable to regulate and may also be selected herein to occur for a selected and relatively limited period of time prior to any ensuing polymerization. For example, one may partially neutralize according to the requirements noted above and allow for such partial neutralization to remain at the previously specified neutralization temperatures for a period of time up to and including 6.0 hours, including all time periods between 0.1 hours to 6.0 hours, in 0.1 hourly increments. More preferably, the neutralization time period at the previously specified temperature may be selected such that it does not exceed a time period of 2.0 hours. Finally, the neutralization time period at the previously specified temperature may be preferably selected such that it does not exceed a time period of 1.0 hours.

In addition, it may be appreciated that one may accomplish neutralization by, e.g., operating for no more than an accumulated time period of 6.0 hours at a temperature of 50° C. to 150° C., by cooling outside such temperature and time period, to otherwise limit isomerization of the reacting monomers, as discussed more fully below. For example, one may partially neutralize as noted above for a period of 0.5 hours at a temperature of 50° C. to 150° C., then cool to about 25° C. This may then be followed by heating and neutralizing for another 0.5 hours at a temperature of 50° C. to 150° C. This then would provide a preferred time and temperature of neutralization, prior to polymerization, of 1.0 hours at a temperature of 50° C. to 150° C.

With respect to the above disclosure regarding the control of neutralization of the acidic vinyl monomers, and in particular, the representative monomer of itaconic acid, it is noted that the use of partial neutralization, at the indicated neutralization temperatures and/or at the indicated neutralization times, may provide for the ability to minimize the isomerization of the vinyl acid monomer (e.g. itaconic acid) to chain terminating structures (i.e. compounds that impede the conversion itaconic acid to poly(itaconic acid). For example, the level of chain terminator, which may be formed from the acidic vinyl monomers may now be controlled to be present at or below the level of 20.0 mole percent, for each mole of acidic vinyl monomer that is initially present. More preferably, the level of chain terminator sourced from the acidic vinyl monomer may be controlled, through the neutralization procedures noted herein, to be present at levels of at or below 10.0 mole percent for each mole of acidic vinyl monomer, and in the most preferred embodiment, such level of chain terminator is controlled to be present at or below 5.0 mole percent. For example, the level of chain terminator may preferentially be adjusted to be in the range of 0.1 mole percent to 5.0 mole percent.

One representative example of the formation of chain terminator from a vinyl acidic monomer again points to the representative use of itaconic acid. More specifically, it is contemplated that itaconic acid may rearrange to provide citraconic acid or mesaconic acid, according to the following general equation, which citraconic or mesaconic acid, as a tri-substituted vinyl monomer, is believed to retard polymerization conversion and/or molecular weight.

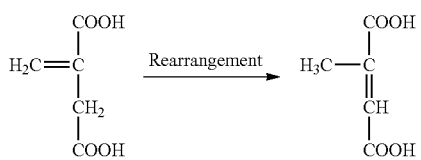

Polymerization

Subsequent to neutralization, according to the use of the partial neutralization noted herein at the indicated windows of, e.g., time and temperature, polymerization may be initiated. Initially, the vinyl monomers noted herein containing acidic functionality (see again I, II or III noted above) may be combined in a solvent to provide a solids content of 50 wt. % to 90 wt. %, including all values therein in 1.0 wt. % increments. The solids content may more preferably be in the range of 60 wt. % to 80 wt. % or 65 wt. % to 75 wt. %. Solids content may be understood as the wt. % of monomer in the solvent that is employed.

One may then employ radical initiation, utilizing free radical initiators such as peroxides and azo compounds, such as azobisisobutyronitrile (AIBN). One may also preferably utilize water-soluble radical initiators wherein the initiators are prepared in solution by dissolving the selected initiator in deionized water or a combination of water miscible polar solvents. Water soluble initiators may include persulfate salts, such as ammonium persulfate, sodium persulfate and potassium persulfate, including mixtures thereof. Also useful as a water soluble initiator are hydrogen peroxide ($H_2O_2$), tertiobutyl hydroperoxide, and water soluble azo initiators.

The initiators may be present at the concentration of 0.05 wt. % to 15.0 wt. % of monomer present, and all values therein, at 0.05 wt. % increments. More preferably, the initiators may be present at a level of 0.10 wt. % to 6.0 wt. % of monomer present, or at a level of 0.20 wt. % to 4.0 wt. % of the monomer present. In addition, the initiators may be selected such that they have an effective temperature for a 10.0 hour half-life $(T10)_{1/2}$, or time to decrease to half of their initial concentration, of less than or equal to 100° C. In other words, preferentially, the initiators are selected such that less than half of the initiator remains present after 10 hours, at temperatures above 100° C. In this manner, it can be assured that sufficient free radicals are generated during the polymerization. The initiator may be sequentially introduced into the polymerization solution (monomer and solvent) by introducing the herein disclosed amount of initiator over the first 75% of the time assigned for polymerization. For example, for a 3 hour polymerization period, one may introduce the initiator such that the first 50% of all initiator to be added is introduced at the start of the polymerization period, and the remaining 50% is added over the 2.25 hours. Furthermore, one may elect to add all of the desired amount of initiator at the start of the selected polymerization period. However, it may be preferred to utilize sequential addition, as this may support continuous polymerization processes. The solution of monomer and solvent, subsequent to the neutralization procedures noted herein, may then be heated to a temperature of 50° C. to 150° C., including all values therein in 1.0° C. increments. More preferably, the polymerization temperature may be set to 70° C. to 115° C. or 80° C. to 110° C. In addition, the time for polymerization of the monomers may be from 0.1 hours to 48 hours, including all values therein, in 0.1 hour increments. More preferably, the time for polymerization may be set to a time period of 0.2 hours to 12.0 hours or 0.3 hours to 3.0 hours.

Polymer MW And Tacticity

The polymers produced herein have been found to have weight average molecular weights (Mw) at or above 20,000 g/mole, and number average molecular weights (Mn) at or above 5,000 g/mole. More specifically, the values of Mw obtained herein may be in the range of 20,000 to 1,000,000 g/mole including all values therein, in increments of 1000. For example, Mw values that may be obtained herein may be in the range of 20,000 to 350,000 g/mole. Similarly, Mn values may be in the range of 5,000 to 25,000 g/mole including all values therein in increments of 1000.

It is also contemplated herein that one may, e.g., combine and react the monomers under the neutralization conditions noted herein (e.g. partially neutralizing the acid functionality at a level of 25.0 mole % to 85.0 mole %) for each mole of carboxylic acid functionality present, wherein said partial neutralization takes place over a time period not to exceed 6.0 hours at a temperature of 50° C. to 150° C.), such that the above MW values are obtained. Then, one may optionally introduce crosslinking, which may be achieved by the introduction of a monomer that provides crosslinking (e.g. a monomer containing 3 or more vinyl groups). In such manner, the polymers produced herein may become part of a crosslinked network while maintaining their indicated functionality characteristics for the substituents $R_1$, $R_2$ and $R_3$, noted herein.

The polymers prepared herein may also have a desired level of tacticity with respect to the analysis of triad structure by NMR techniques. For example, the polymers herein may specifically be formed with the presence of syndiotactic triads, at a level of greater than 58.0%. For example, the level of syndiotactic triads as determined by NMR techniques, such as $^{13}$C NMR, may be formed at the level of greater than 58.0% to 75.0%, including all values therein, in 1.0% increments.

EXAMPLES

C-13 NMR Analysis: 13C NMRs were obtained with a Varian (500 MHz $^1$H) with 45° pulse angle, 12 s delay between pulses/re magnetization and 3000 accumulations. The experiments were performed at T=25° C. in 5 mm diameter NMR tubes. NMR samples had a concentration of approximately 0.25 g/g in D$_2$O. A drop of 1,4-dioxane was added to each sample as reference (peak at 67.4 ppm). The pH was adjusted with a solution of hydrochloric acid at 12N. All samples had pH between 0.2 and 1.5. Tacticity was determined from the chemical shifts of the triads from the beta carbonyl with the following assignments:

178.7 ppm rr triad (s-syndiotactic)
178.2 ppm mr triad(h-atactic or heterotactic)
177.6 ppm mm triad (i-isotactic)

Syndiotacticity is calculated as the ratio of the area of the rr triad over the area of all triads (rr+mr+mm).

"Synthesis A" was conducted using the representative monomer itaconic acid; 2,2'-azodiisobytyronitrile(AIBN), hydrogen peroxide; tertio butyl hydroperoxide (tBHP); ferric ammonium sulfate; toluene; Span 80; and hydrochloric acid, without further purification. 50 g (0.385 mol) of itaconic acid was half neutralized with 5 g (0.385 mol) sodium hydroxide, and was dissolved in 25 ml deionized water into a flask, and 8 mg ferric ammonium sulfate was added. The mixture was heated to 80° C. and 25 ml tBHP (70 wt % in water); 50 ml H202 (35 wt % in water) were fed by syringe pump for 2 hours, and heat was maintained for an additional 4 hours. The product was dried at 25° C. under vacuum for 10 hours.

Figure 2:
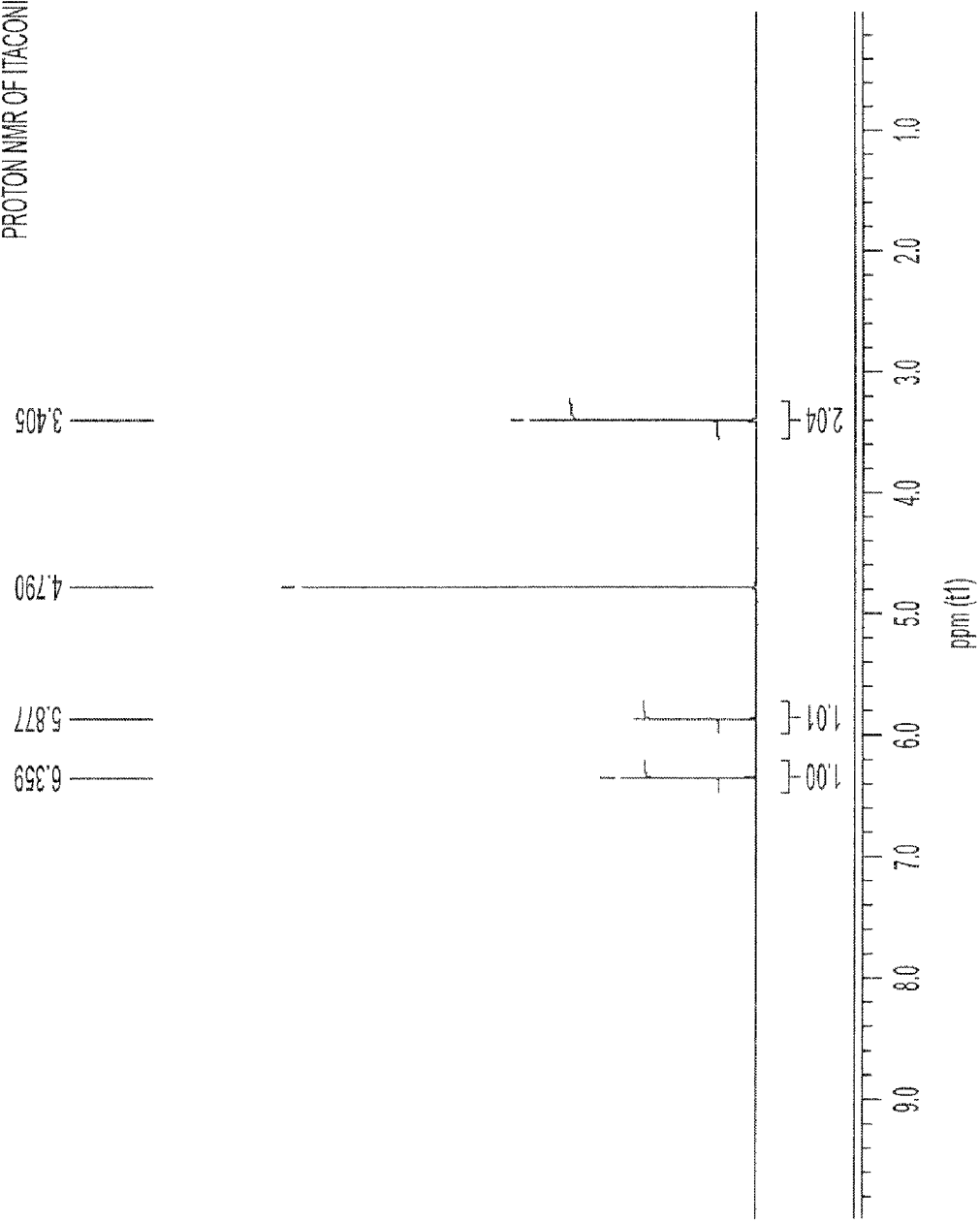
FIG. 2 shows the 400 MHz $^1$H NMR spectra of itaconic acid monomer in $D_2O$.
Figure 3:
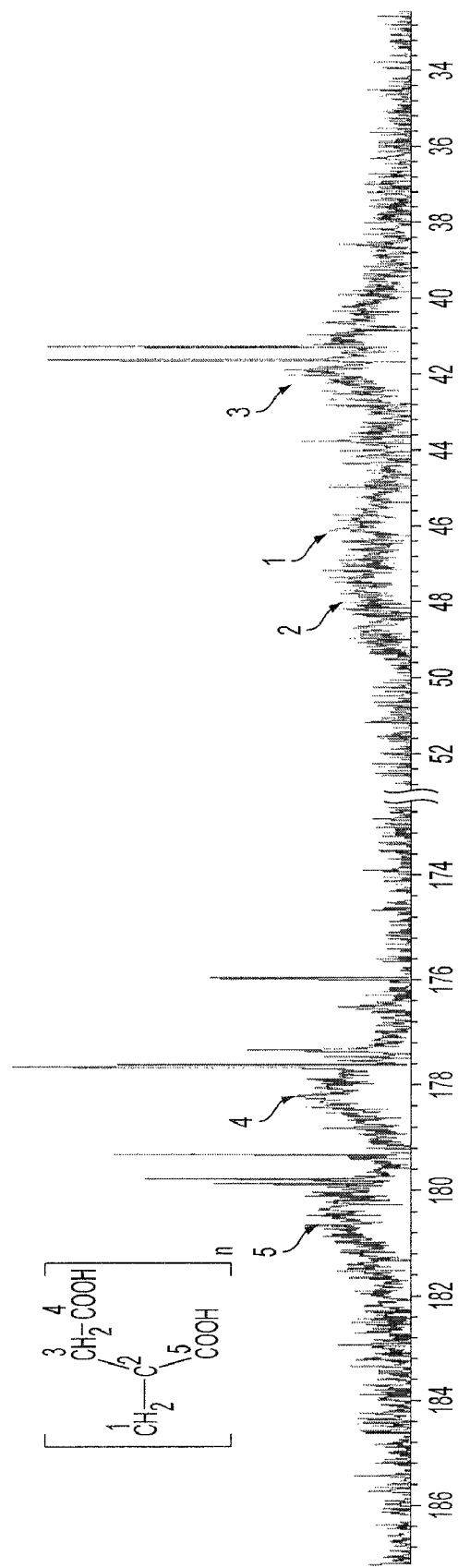
FIG. 3 shows the 400 MHz $^{13}$C NMR spectra of poly (itaconic acid) in $D_2O$ corresponding to Synthesis A.
Figure 4:
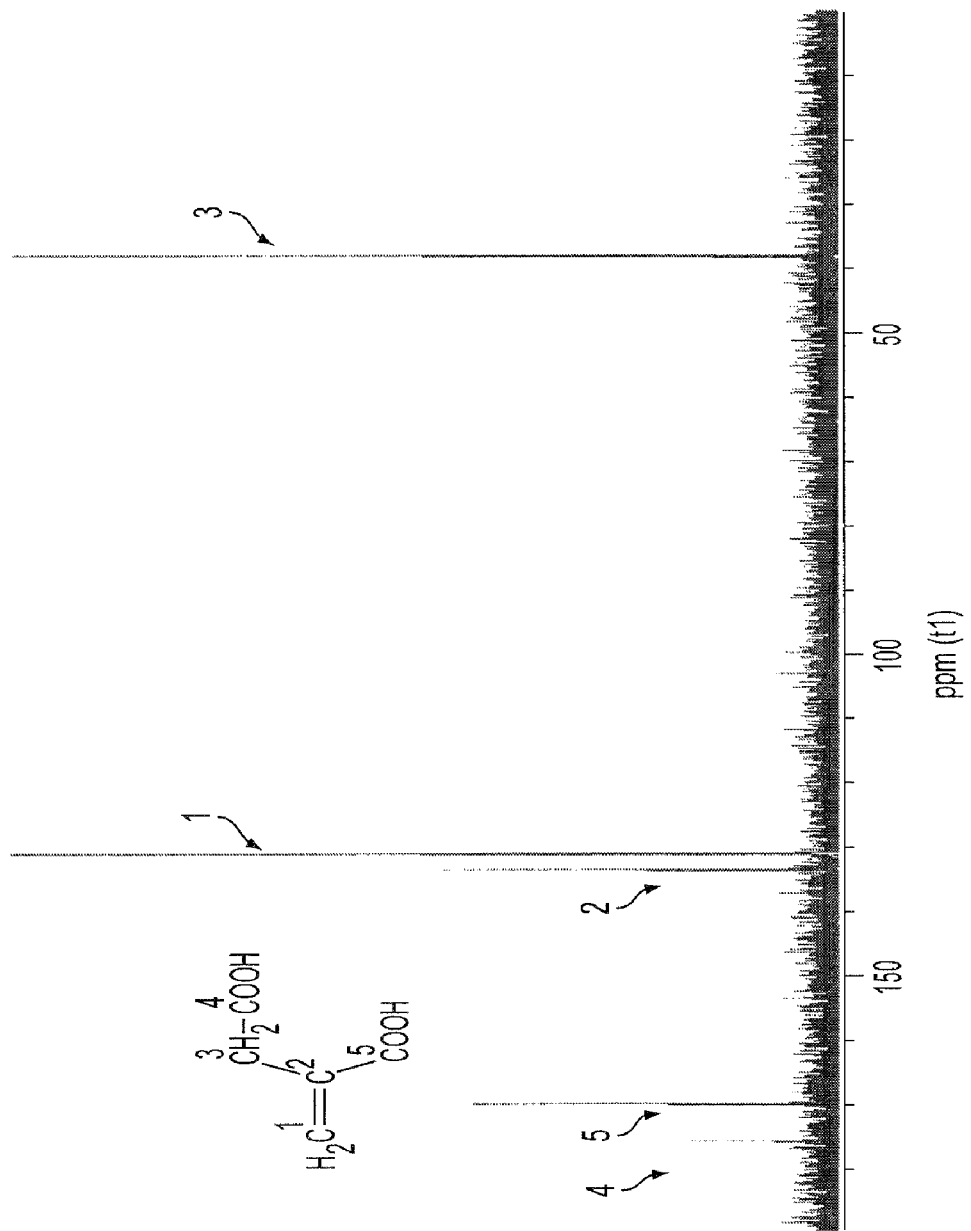
FIG. 4 shows the 400 MHz $^{13}$C NMR spectra of itaconic acid.

A Varian 400 MHz NMR was used to investigate the structure of the resulting polymers. FIG. 1 shows the $^1$H NMR spectra for Synthesis A, where the two vinylic proton peaks in the itaconic acid monomer, as shown in FIG. 2, disappeared completely, and the IR spectra for Synthesis A supports it, and two distinct peaks with the similar area around 2.7 ppm and 2.0 ppm describe the CH$_2$ in the side group and backbone separately, indicating the structure of poly(itaconic acid). The sample from Synthesis A analyzed by $^1$H NMR was not precipitated in acetone, and the calculated polymerization yield was 100%. However, some additional sharp peaks were observed in the $^1$H NMR indicating an extensive and complex reaction of the large quantity of the redox initiator. The five resonance frequencies of the $^{13}$C NMR spectra of the Synthesis A and itaconic acid monomer, as shown in FIGS. 3 and 4, are compared in Table 1.

TABLE 1

| | Carbon | | | | |
|---|---|---|---|---|---|
| | C1 | C2 | C3 | C4 | C5 |
| Chemical Shifts For Itaconic Acid (ppm) | 128.0 | 130.5 | 36.8 | 176.2 | 171.1 |
| Chemical Shifts For Poly(itaconic acid) (ppm) | 47.8 | 49.2 | 42.8 | 178.9 | 180.6 |

After polymerization, the chemical shifts of the carbons in side groups do not change much. However, the carbons C1 and C2 of the double bond in the monomer are absent and its resonance is shifted to 45.8 and 47.2 ppm, which is a sign for the formation of a polymer backbone.

With respect to the various polymerizations noted above, it is contemplated herein that the polymerizations may be suitable for a continuous polymerization process (i.e. a polymerization process that runs continuously and continuously provides polymeric material). More specifically, one may utilize a polymerization reactor that may be described as containing optionally a single or double shaft with helicoidal elements that may then mix and displace the polymerizing reactants (see again, the above indicated monomers) along a main tube. The elements may be designed to maintain the reacting materials from stagnating at any given point within the tubular reactor, while displacing or conveying the materials in order to optimize heat transfer, mass transport and mixing. The residence time of the reactants in the tube may be varied, and the diameter of the tube may be in the range of 0.1 inch to 20 feet, with a length of 2 feet to 1000 feet. With respect to such a continuous process, the features all noted above with respect to controlling the level of neutralization (25.0 mole % to 85.0 mole %), time for neutralization (not to exceed 6.0 hours at a temperature of 50.0° C. to 150° C.), percent conversion (50% to 99.9%), weight average molecular weight (at or above 20,000 g/mole), syndiotacticity greater than 58% may all again be applied to the continuous polymerization procedure.

Example I 100 grams of itaconic acid and 50 grams of deionized water were added to a 250 ml plastic beaker and 30.8 grams of sodium hydroxide was added slowly with manually stirring while the beaker was kept cold with an ice water bath. The solution was then added to a 250 milliliter, 3-neck round bottom flask equipped with a mechanical stirrer, nitrogen feed line, water cooled condenser, and thermometer. After the flask content was heated to 100 degree centigrade, 1 ml of 70% tertiobutyl hydroperoxide aqueous solution was added. The reaction was then held for two and a half hours, then cooled down.

Figure 5:
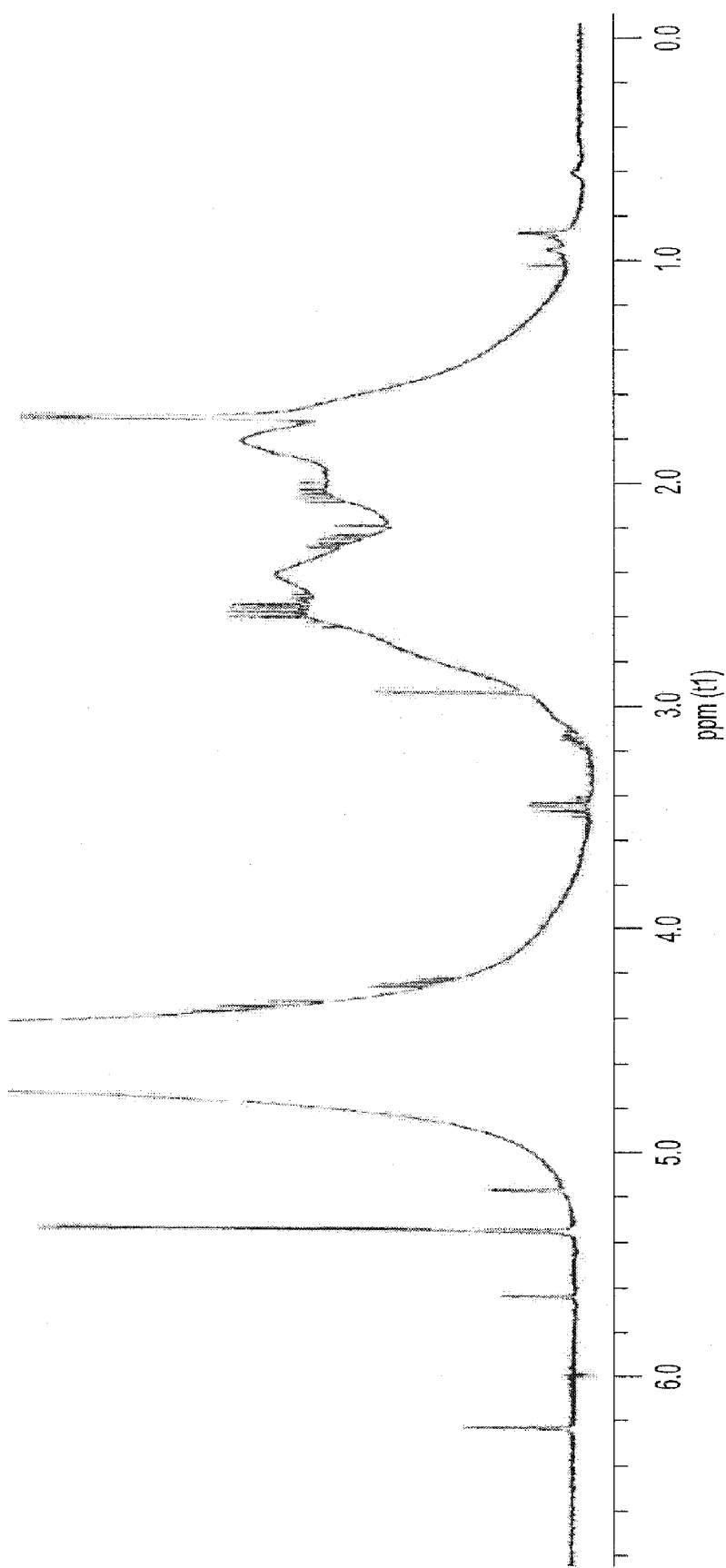
FIG. 5 shows the 400 MHz $^1$H NMR spectra of poly(itaconic acid) in $D_2O$ corresponding to Example I.
Figures 6A, 6B:
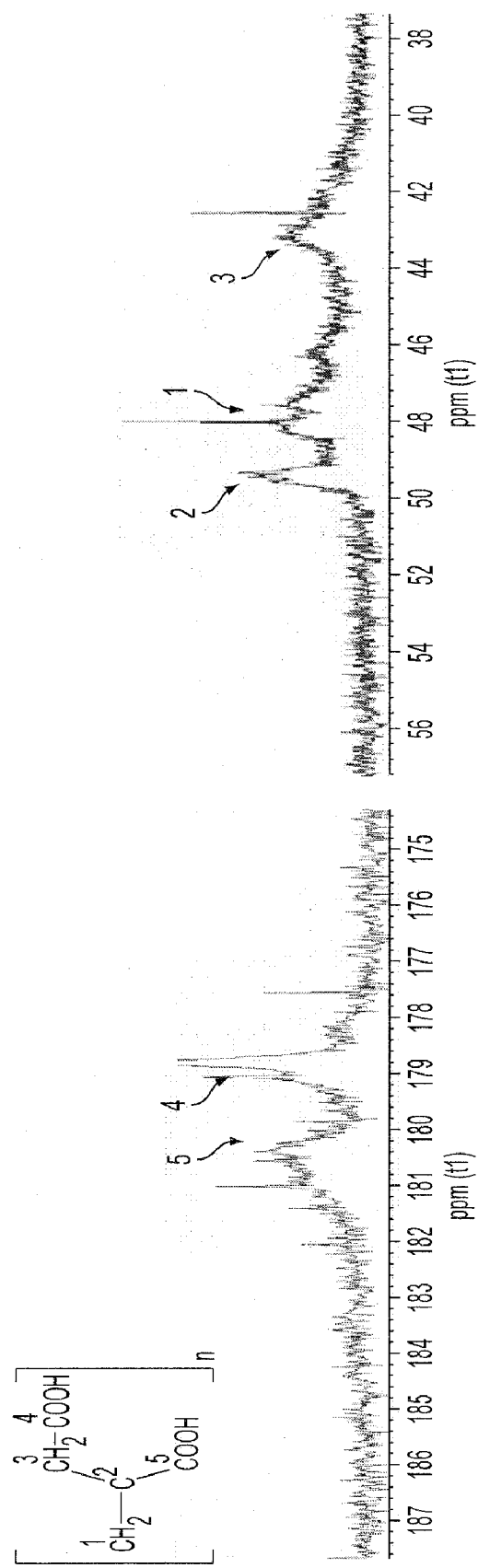
FIG. 6a shows the 400 MHz $^{13}$C NMR spectra of poly (itaconic acid) at the chemical shift/ppm of 187 to 175 corresponding to Example I.
FIG. 6b shows the 400 MHz $^{13}$C NMR spectra of poly (itaconic acid) at the chemical shift/ppm of 56 to 38 corresponding to Example I.

The resultant solution showed 97.7 percent conversion of the itaconic acid into a polymer by NMR. FIG. 5 shows the $^1$H NMR of this same in D20 used for the quantification of the polymerization yield. Based on gel permeation chromatography, the average molecular weight was 10,180 g/mole, and the number average molecular weight (Mn) was 3,920 g/mole, in polyacrylic acid equivalent molecular weight. FIGS. 6a and 6b show the $^{13}$C NMR of this sample with the same peak assignment as used in Table 1, providing evidence for the synthesis of polyitaconic acid.

Example II

The procedure of EXAMPLE I was repeated except 0.5 milliliter of 70% tertiobutyl hydroperoxide was added after the reaction mixture reached 100 degree centigrade. The reaction was then held for 160 minutes and then cooled down. The resultant solution showed 72.5 percent conversion of the itaconic acid into a polymer by NMR. Based on gel permeation chromatography, the weight average molecular (Mw) was 20,150 g/mole, and the number average molecular weight (Mn) was 7,930 g/mole in polyacrylic acid equivalent molecular weight.

Example III

The procedure of EXAMPLE I was repeated except 2 milliliter of 70% tertiobutyl hydroperoxide was added after reaching 100 degree centigrade. The reaction was then held for 155 minutes and then cooled down. The resultant solution showed 90.3 percent conversion of the itaconic acid into a polymer by NMR. Based on gel permeation chromatography, the weight average molecular (Mw) was 7,690, and the number average molecular weight (Mn) was 3,390 g/mole in polyacrylic acid equivalent molecular weight.

Example IV

The procedure of EXAMPLE I was repeated except 30.8 grams of sodium hydroxide was added quickly without cooling and 0.5 milliliter of 70% tertiobutyl hydroperoxide as initiator was added after reaching 100 degree centigrade. The reaction was then held for 80 minutes and then cooled down. The resultant polymer solution showed 67.4 percent conversion of the itaconic acid into a polymer by NMR. Based on gel permeation chromatography, the weight average molecular (Mw) was 11,820 and the number average molecular weight (Mn) was 5,410 g/mole in polyacrylic acid equivalent molecular weight.

Example V 100 grams of itaconic acid and 50 grams of deionized water were added to a flask and then set to stir and 30.8 grams of sodium hydroxide was added slowly with cooling by ice water. The solution was added to a reaction calorimeter (Chemisens CPA 200) equipped with a mechanical stirrer and thermometer. Nitrogen was purged before reaction. 0.5 milliliter of 70% tertiobutyl hydroperoxide as initiator was added after the content was heated to 90 degree centigrade. The reaction was then held for 130 minutes and then cooled and packaged.

Example VI

The procedure of EXAMPLE I was repeated except 70 grams of deionized water was added and 0.5 milliliter of 70% tertiobutyl hydroperoxide was added after reaching 100 degree centigrade. The reaction was then held for 2 and a half hours and then cooled down.

Example VII

The procedure of EXAMPLE I was repeated except 100 grams of deionized water was added and 0.5 milliliter of 70% tertiobutyl hydroperoxide was added after reaching 100 degree centigrade. The reaction was then held for 85 minutes and then cooled down. The resultant polymer solution showed 30.8 percent conversion of the itaconic acid into a polymer by NMR. Based on gel permeation chromatography, the weight average molecular (Mw) was 15,110 and the number average molecular weight (Mn) was 6,840 g/mole in polyacrylic acid equivalent molecular weight.

Example VIII 100 grams of itaconic acid and 50 grams of deionized water were added to a 250 ml beaker and 30.8 grams of sodium hydroxide was added slowly while the beaker was kept cold with an ice water bath. The solution was then added to a 250 milliliter, 3-neck round bottom flask equipped with mechanical stirrer, nitrogen feed line, water cooled condenser, and thermometer. 0.5 milliliter of 70% tertiobutyl hydroperoxide was added at once after the reaction mixture reached 100 degree centigrade. The reaction was held at 100 C for 160 minutes and then cooled down. The resultant material showed 72.5 percent conversion of the itaconic acid into a polymer as analyzed by $^1$H-NMR. Based on gel permeation chromatography, the weight average molecular (Mw) was 20,150 g/mole, and the number average molecular weight (Mn) was 7,930 g/mole in polyacrylic acid equivalent molecular weight.

Example IX 100 grams of itaconic acid and 50 grams of deionized water were added to a 250 ml, 3-neck round bottom flask equipped with mechanical stirrer, nitrogen feed line, water cooled condenser, and thermometer. 0.5 milliliter of 70% tertiobutyl hydroperoxide was added at once after the reaction mixture reached 100 degree centigrade. The reaction was held at 100 C for 150 minutes and then cooled down. The resultant solution showed 26.8 percent conversion of the itaconic acid into a polymer polymer as analyzed by $^1$H-NMR.

Example X

The procedure of EXAMPLE VIII was repeated except 18.6 grams of sodium hydroxide was added slowly with manually stirring while the beaker was kept cold with an ice water bath. The reaction was held at 100 C for 150 minutes and then cooled down. The resultant solution showed 48.5 percent conversion of the itaconic acid into a polymer as analyzed by $^1$H-NMR.

Example XI

The procedure of EXAMPLE VIII was repeated except 43.1 grams of sodium hydroxide was added slowly with manually stirring while the beaker was kept cold with an ice water bath. The reaction was held at 100 C for 150 minutes and then cooled down. The resultant solution showed 64.9 percent conversion of the itaconic acid into a polymer as analyzed by $^1$H-NMR.

Example XII

The procedure of EXAMPLE VIII was repeated except 61.6 grams of sodium hydroxide was added slowly with manually stirring while the beaker was kept cold with an ice water bath. The reaction was held at 100 C for 150 minutes and then cooled down. The resultant solution showed 26.2 percent conversion of the itaconic acid into a polymer as analyzed by $^1$H-NMR.

Example XIII 5000 gr of itaconic acid and 500 grams of deionized water were placed in a 10 L kneader-reactor at 50 C. 3077 grams of sodium hydroxide at 50 wt % in water was added over 15 minutes. 71 grams of 70% tertiobutyl hydroperoxide was added at once. The reactor was pressurized to 0.5 bar above atmospheric pressure with nitrogen then heated to 90° C. Mixing and heating were maintained for 130 minutes, and then the reactor was cooled down. The resultant material showed 95 percent conversion of the itaconic acid into a polymer as analyzed by $^1$H-NMR. Based on gel permeation chromatography, the weight average molecular (Mw) was 29,136 g/mole, and the number average molecular weight (Mn) was 8,003 g/mole in polyacrylic acid equivalent molecular weight.

Example XIV 4000 gr of itaconic acid was placed in a 10 L kneader-reactor at 70 C. 2462 grams of sodium hydroxide at 50 wt % in water was added over 15 minutes. 60 grams of tetraethylene glycol diacrylate was added. The reactor was pressurized to 0.5 bar above atmospheric pressure with nitrogen then heated to 100° C. 57 grams of 70% tertiobutyl hydroperoxide was added at once under pressure. Mixing and heating were maintained for 100 minutes, and then the reactor was cooled down. The resultant material showed 97 percent conversion of the itaconic acid into a polymer as analyzed by $^1$H-NMR. Based on gel permeation chromatography, the weight average molecular (Mw) was 78,532 g/mole, and the number average molecular weight (Mn) was 6,866 g/mole in polyacrylic acid equivalent molecular weight.

Example XV 4000 gr of itaconic acid was placed in a 10 L kneader-reactor at 70 C. 2462 grams of sodium hydroxide at 50 wt % in water was added over 12 minutes. 170 grams of 70% tertiobutyl hydroperoxide was added at once. The reactor was pressurized to 0.5 bar above atmospheric pressure with nitrogen then heated to 100° C. Mixing and heating were maintained for 65 minutes, and then the reactor was cooled down. The resultant material showed 99 percent conversion of the itaconic acid into a polymer as analyzed by $^1$H-NMR. $^{13}$C-NMR analysis of the triads in the 177-178 ppm region resulted in a 64% syndiotacticity at pH=0.82. Based on gel permeation chromatography, the weight average molecular (Mw) was 18,586 g/mole, and the number average molecular weight (Mn) was 4,364 g/mole in polyacrylic acid equivalent molecular weight.

Example XVI 5000 gr of itaconic acid was placed in a 10 L kneader-reactor at 70 C. 3077 grams of sodium hydroxide at 50 wt % in water was added over 15 minutes. 100 grams of tetraethylene glycol diacrylate and 71 grams of 70% tertiobutyl hydroperoxide were added at once. The reactor was pressurized to 0.5 bar above atmospheric pressure with nitrogen then heated to 90° C. Mixing and heating were maintained for 80 minutes, and then the reactor was cooled down. The resultant material showed 95 percent conversion of the itaconic acid into a polymer as analyzed by $^1$H-NMR. The resulting polymer was crosslinked, and swelled 120 times its own mass of deionized water.

Example XVII 650 gr of itaconic acid and 400 grams of sodium hydroxide at 50 wt % solution in water were co-added over 15 minutes into a 1 L jacketed reactor at 70° C. under mechanical stirring under nitrogen atmosphere. The reactor was then heated to 100° C. and 80 ml of 70 wt. % tertiobutyl hydroperoxide in water was added at once. Mixing and heating were maintained for 120 minutes, and then the reactor was cooled down. The resultant material showed 98.7 percent conversion of the itaconic acid into a polymer as analyzed by $^1$H-NMR. $^{13}$C-NMR analysis of the triads in the 177-178 ppm region resulted in a 62% syndiotacticity. Based on gel permeation chromatography, the weight average molecular (Mw) was 12,800 g/mole, and the number average molecular weight (Mn) was 4,574 g/mole in polyacrylic acid equivalent molecular weight.

Figure 7:
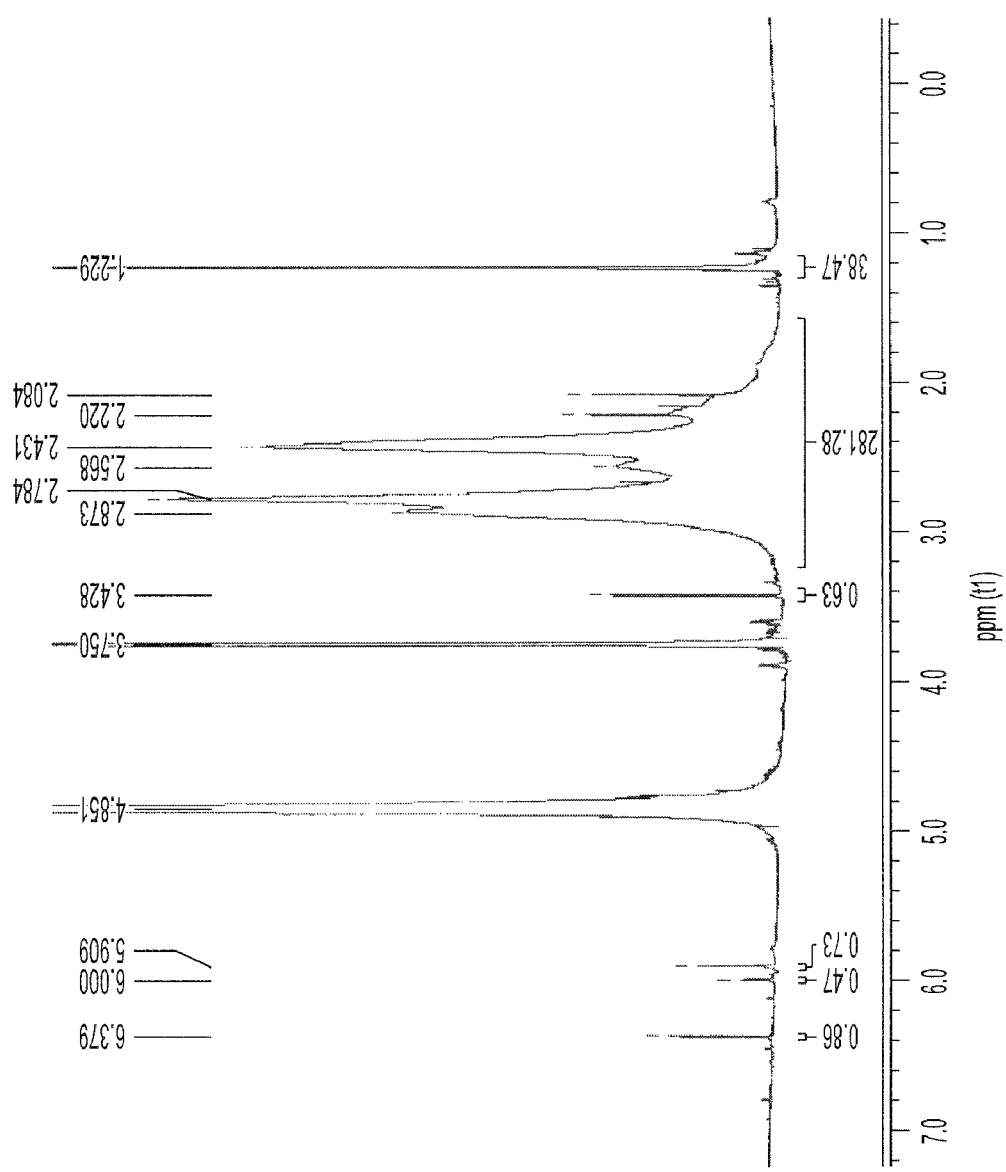
FIG. 7 shows the $^1$H NMR spectra of poly(itaconic acid, sodium salt) in $D_2O$ from Example XVIII.
Figure 8:
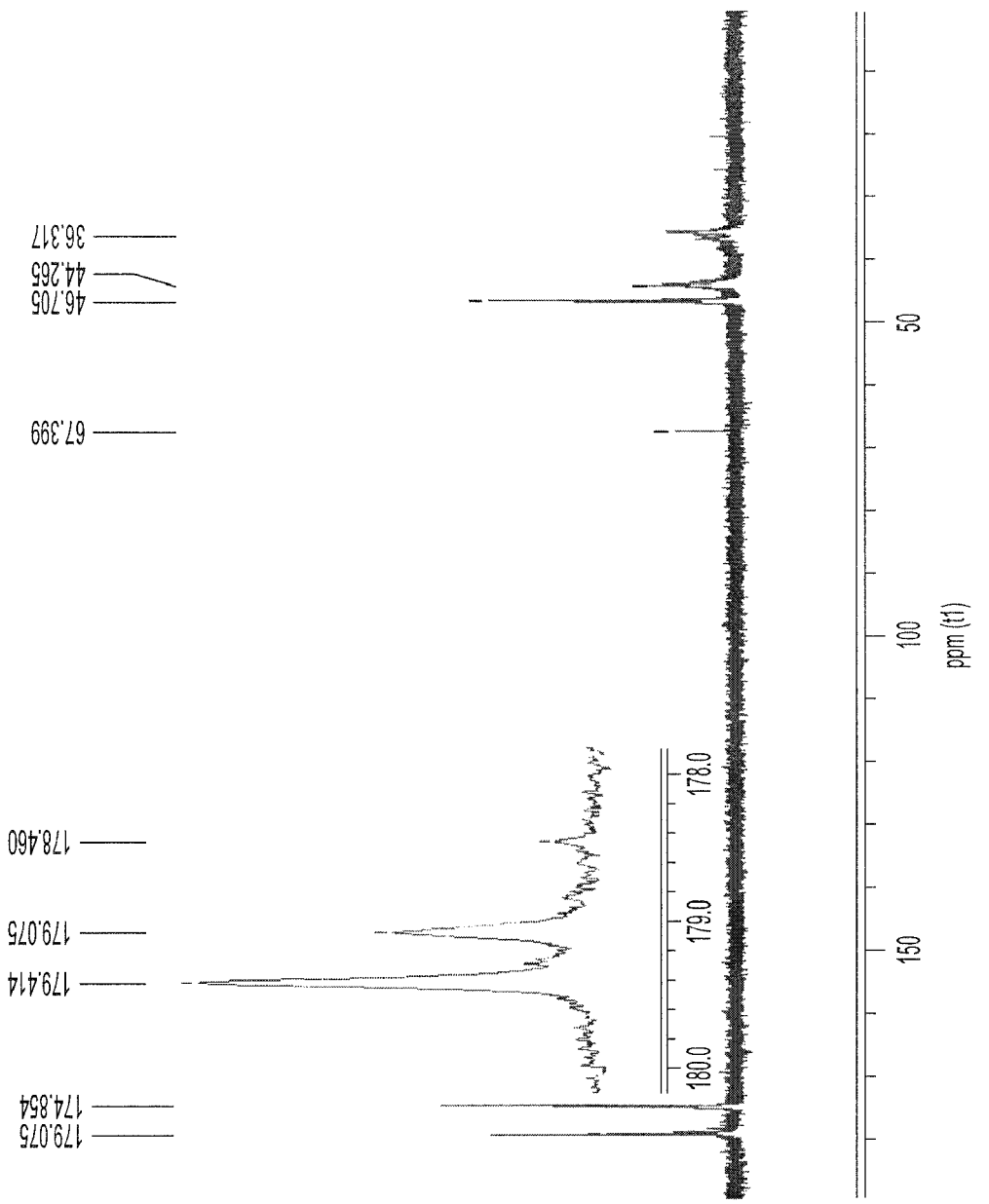
FIG. 8 shows the $^{13}$C NMR spectra of poly(itaconic acid) in $D_2O$ at pH=1 from Example XVIII.

Example XVIII 650 gr of itaconic acid and 400 grams of sodium hydroxide at 50 wt % solution in water were co-added over 15 minutes into a 1 L jacketed reactor at 70 C under mechanical stirring under nitrogen atmosphere. The reactor was then heated to 110° C. and 20 ml of 70 wt. % tertiobutyl hydroperoxide in water was added at once. Mixing and heating were maintained for 120 minutes, and then the reactor was cooled down. FIG. 7 shows the $^1$H NMR spectra of the poly(itaconic acid, sodium salt) in D$_2$O. FIG. 8 shows the $^{13}$C NMR spectra of the poly(itaconic) in D$_2$O. The resultant material showed 99.7 percent conversion of the itaconic acid into a polymer as analyzed by $^1$H-NMR. $^{13}$C-NMR analysis of the triads in the 177-178 ppm region resulted in a 61% syndiotacticity. Tacticity was measured by integrating by integrating the peak area triads in the 177-178 ppm range, seen in the enlargement in FIG. 8. Based on gel permeation chromatography, the weight average molecular (Mw) was 27,687 g/mole, and the number average molecular weight (Mn) was 7,867 g/mole in polyacrylic acid equivalent molecular weight.

Example XIX 650 gr of itaconic acid and 400 grams of sodium hydroxide at 50 wt % solution in water were co-added over 15 minutes into a 1 L jacketed reactor at 70 C under mechanical stirring under nitrogen atmosphere. The reactor was then heated to 90° C. and 60 ml of 50 wt % hydrogen peroxide in water was added at once. Mixing and heating were maintained for 60 minutes, and then the reactor was cooled down. The resultant material showed 94 percent conversion of the itaconic acid into a polymer as analyzed by $^1$H-NMR. Based on gel permeation chromatography, the weight average molecular (Mw) was 10,975 g/mole, and the number average molecular weight (Mn) was 3,795 g/mole in polyacrylic acid equivalent molecular weight.

Example XX 650 gr of itaconic acid and 400 grams of sodium hydroxide at 50 wt % solution in water were co-added over 15 minutes into a 1 L jacketed reactor at 70 C under mechanical stirring under nitrogen atmosphere. The reactor was then heated to 100° C. and 40 ml of 50 wt % hydrogen peroxide in water was added at once. Mixing and heating were maintained for 120 minutes, and then the reactor was cooled down. The resultant material showed 95 percent conversion of the itaconic acid into a polymer as analyzed by $^1$H-NMR. Based on gel permeation chromatography, the weight average molecular (Mw) was 17,520 g/mole, and the number average molecular weight (Mn) was 6,540 g/mole in polyacrylic acid equivalent molecular weight.

Example XXI

In a 1.3 L continuously stirred tank reactor set at 80° C. with mechanical stirring under nitrogen atmosphere itaconic acid was uniformly fed at the rate of 2600 grams per hour. In the same reactor a sodium hydroxide aqueous solution at 50 wt % was co-fed uniformly at 1600 grams per hour. The content of this first reactor was continuously pumped out at the rate of 4200 grams per hour while maintaining the level of the reactor constant at 1 L. A solution of 50 wt % hydrogen peroxide in water was co fed uniformly into a mixing zone with the previous stream at the rate of 60 ml/hour. The resulting solution was pumped through a 775 ml tubular reactor (6.0 meters long by 1.24 cm diameter) coiled into a heated bath at 90° C. The resulting product streaming out of the tubular reactor continuously was cooled down to room temperature. Upon reaching steady state conditions, a representative sample of the material showed 52 percent conversion of the itaconic acid into a polymer (estimated by GPC). Based on gel permeation chromatography, the weight average molecular (Mw) was 168,440 g/mole, and the number average molecular weight (Mn) was 17,653 g/mole in polyacrylic acid equivalent molecular weight.

Example XXII 67.7 gr of itaconic acid, 23.0 grams of sodium hydroxide at 50 wt % solution in water and 9.3 grams of pure sodium hydroxide were co-added over 15 minutes into a 250 ml round bottom flask at 80 C with magnetic stirring under nitrogen atmosphere. The reactor was then heated to 100° C. and 3.1 ml of 70 wt. % tertiobutyl hydroperoxide in water was added at once. Mixing and heating were maintained for 60 minutes, and then the reactor was cooled down. The resultant material showed 98.1 percent conversion of the itaconic acid into a polymer as analyzed by $^1$H-NMR. $^{13}$C-NMR analysis of the triads in the 177-178 ppm region resulted in a 62% syndiotacticity at pH=0.20. Based on gel permeation chromatography, the weight average molecular (Mw) was 9,159 g/mole, and the number average molecular weight (Mn) was 3,573 g/mole in polyacrylic acid equivalent molecular weight.

Example XXIII

In a 1.3 L continuously stirred tank reactor set at 80° C. with mechanical stirring under nitrogen atmosphere itaconic acid was uniformly fed at the rate of 1450 grams per hour. In the same reactor a sodium hydroxide aqueous solution at 50 wt % was co-fed uniformly at 890 grams per hour. The content of this first reactor was continuously pumped out at the rate of 2340 grams per hour while maintaining the level of the reactor constant at 1 L. A solution of 50 wt % hydrogen peroxide in water was co fed uniformly into a mixing zone with the previous stream at the rate of 120 ml/hour. The resulting solution was pumped through a 774 ml tubular reactor (2.0 meters long by 2.22 cm diameter) coiled into a heated bath at 90° C. The resulting product streaming out of the tubular reactor continuously was cooled down to room temperature. Upon reaching steady state conditions, a representative sample of the material showed 92 percent conversion of the itaconic acid into a polymer (estimated by GPC). Based on gel permeation chromatography, the weight average molecular (Mw) was 318,000 g/mole, and the number average molecular weight (Mn) was 28,900 g/mole in polyacrylic acid equivalent molecular weight.

Commercial Poly(Itaconic Acid)

A poly(itaconic acid) was made available from 'Monomer-Polymer and Dajac Labs, Inc. and analyzed. The commercial polymer showed 48% percent of purity in polymer as analyzed by $^1$H-NMR. Purification/concentration was required in order to perform the $^{13}$C-NMR analysis. and was done with a 3000MWCO filter by centrifugation. $^{13}$C-NMR analysis of the triads in the 177-178 ppm region resulted in a 52% syndiotacticity (pH=0.94). Based on gel permeation chromatography, the weight average molecular (Mw) was 19600 g/mole, and the number average molecular weight (Mn) was 3700 g/mole in polyacrylic acid equivalent molecular weight.

Comparative Polymerization I

To a one neck glass round bottom flask equipped with a reflux condenser and a magnetic stirrer, was added 50 ml 0.5 M HCl, 10 g of itaconic acid and 0.60 g of potassium persulfate. The content was heated at 60° C. during 68 hours. The polymer solution was precipitated in acetone (HPLC grade). Filtration was performed and the solid obtained was dried in the oven at 50° C. $^{13}$C-NMR analysis of the triads in the 177-178 ppm region resulted in a 46.5% syndiotacticity (pH=1.05). Based on gel permeation chromatography, the weight average molecular weight (Mw) was 17,800 g/mole, and the number average molecular weight (Mn) was 8,800 g/mole in polyacrylic acid equivalent molecular weight. It is noted that this comparative polymerization I is based upon method A reported in: "Polymerization of Itaconic Acid In Aqueous Solution: Structure Of The Polymer And Polymerization Kinetics At 25° C. Studied By Carbon-13 NMR", Grespos et al, Makromolekulare Chemie, Rapid Communications (1984), 5(9), 489-494.

Comparative Polymerization II

To a three neck glass round bottom flask equipped with a reflux condenser, a magnetic stirrer, under nitrogen atmosphere, was added 83 ml of m-xylene, 7.5 g of itaconic anhydride and 0.17 g of AIBN. The reaction mixture was heated at 60° C. for 2 days. The resulting poly(itaconic anhydride) was filtered, washed with m-xylene and ethyl ether. The solid (4.6 g) was then mixed with 15 ml of water overnight. The solution was dried under vacuum (10 mmHg) at 50° C. The resultant material showed 83 percent pure in polymer as analyzed by $^1$H-NMR. $^{13}$C-NMR analysis of the triads in the 177-178 ppm region resulted in a 34% syndiotacticity (pH=0.88). Based on gel permeation chromatography, the weight average molecular weight (Mw) was 7,505 g/mole, and the number average molecular weight (Mn) was 2,915 g/mole in polyacrylic acid equivalent molecular weight. It is noted that this comparative polymerization II is based upon method C reported in: "Polymerization of Itaconic Acid In Aqueous Solution: Structure Of The Polymer And Polymerization Kinetics At 25° C. Studied By Carbon-13 NMR", Grespos et al, Makromolekulare Chemie, Rapid Communications (1984), 5(9), 489-494.

Comparative Polymerization III

To a three neck glass round bottom flask equipped with a reflux condenser, a magnetic stirrer, under nitrogen atmosphere, was added 11.6 ml of deionized water. The flask was heated at 90° C. A monomer solution of 20.45 g of itaconic acid, 12.35 g of 50 percent NaOH and 7 g of DI water was prepared. An initiator solution of 1.75 g of potassium persulfate and 25.8 g of water was also prepared. The monomer and initiator solutions were fed into the flask linearly and separately over 2 hours, while maintaining the flask at a temperature sufficient to continue to reflux the mixture, about 100° C. When the addition was complete, the polymer solution was held at temperature for an additional 30 min. The resultant polymer solution had a conversion of 35% (estimated by GPC). The solution was precipitated in acetone. The solid was dried at 50° C. Further purification had to be done to provide quality NMR data. 1 g of product was dissolved in 2 g of $D_2O$ and introduced in a 3000MW filter centrifuge tube. After centrifugation at 8000 rpm for 10 minutes, the retentate was washed twice with 1 ml of $D_2O$ and the pH was adjusted to 0.53. $^{13}$C-NMR analysis of the triads in the 177-178 ppm region resulted in a 49% syndiotacticity. Based on gel permeation chromatography, the weight average molecular weight (Mw) was 1,400 g/mole, and the number average molecular weight (Mn) was 1,000 g/mole in polyacrylic acid equivalent molecular weight. It is noted that this comparative polymerization III is based upon Example I in U.S. Pat. No. 5,336,744.

Comparative Polymerization IV

To a three neck glass round bottom flask equipped with a reflux condenser, a magnetic stirring, under nitrogen atmosphere, was added 23.95 ml of deionnized water, 20.45 g of itaconic acid and 12.35 g of 50 wt % percent NaOH. An initiator solution of 1.54 g of sodium persulfate and 5.79 ml of deionized water was also prepared. The initiator solution was fed into the flask over 2 hours, while maintaining the flask at a temperature sufficient to continue to reflux the mixture, about 100° C. When the addition was complete, the polymer solution was held at temperature during 30 min. The resultant polymer solution had a conversion of 36% (estimated by GPC). The resultant polymer solution was precipitated in acetone. The solid was dried at 50 C. The resulting material was further purified. 1 g of product was dissolve in 2 g of $D_2O$ and introduce in a 3000MW filter centrifuge tube. After centrifugation at 800 rpm for 10 minutes, the retentate was washed twice with 1 ml of $D_2O$ and the pH was adjusted to 0.75. $^{13}C$-NMR analysis of the triads in the 177-178 ppm region resulted in a 53% syndiotacticity. It is noted that this comparative polymerization IV is based upon Example II in U.S. Pat. No. 5,336,744. The utility and application of the polymers produced herein is relatively diverse. For example, the polymers produced herein may be suitable for use as a component in commercial and domestic detergent formulations. In addition, the polymers produced herein may find particular utility for use in water treatment, such as use as a flocculent or antiscaling agent. Furthermore, the polymers herein, due to their relatively high capability of absorbing fluids, may be used as a component in baby/adult diapers as well as in feminine type pads/products. The relatively high fluid adsorption capability may also allow for use as a fluid absorbent in the packaging industry as well as for use in water management for agriculture and lawn care. It is also contemplated that the polymers herein may find use as thickeners or viscosity modifiers, as binders for use in ink formulations, as modifiers for use in mud drilling, as dispersants for paper coating formulations, as sizing agents for fibers, as a sequestrant for mining operations and as an emulsifier in cosmetics.

It should also be appreciated that all of the various embodiments noted herein are interchangeable and features within any of the drawings may be used within each of the respective drawings, to optimize any and all of the disclosed characteristics of the polymerizations noted herein.

The foregoing description of several methods and embodiments has been presented for purposes of illustration. It is not intended to be exhaustive and obviously many modifications and variations are possible in light of the above teaching.

What is claimed is:

1. A method of forming a detergent comprising:
   supplying polymerized monomer, wherein the polymerized monomer is sourced from a monomer having one or more of the following structures:

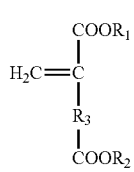

(I)

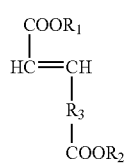

(II)

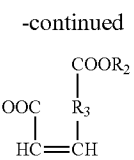

(III)

wherein $R_1$ and $R_2$ are selected from a hydrogen atom or an alkyl group or an aromatic group, or a cyclic alkyl group or a polyether, and combinations thereof and $R_3$ is selected from an alkyl group, aromatic functionality, heteroaromatic functionality, cyclic alkyl group, heterocyclic group, or combinations thereof, wherein at least 50 mole % of $R_1$ and $R_2$ are a hydrogen atom to provide carboxylic acid functionality;

combining at least one of monomers (I), (II) and/or (III) with a solvent and partially neutralizing the carboxylic acid functionality at a level of 25.0 mole % to 85.0 mole % for each mole of carboxylic acid functionality present, wherein said partial neutralization takes place over an accumulated time period not to exceed 6.0 hours and at a temperature of 50.0° C. to 150° C.; polymerizing one of said monomers (I), (II) and/or (III) to form polymerized monomers wherein the percent conversion of one of said monomers to polymer is at or above 50.0%; and combining one of said polymerized monomers as component into a detergent to provide a detergent formulation.

2. The method of claim 1 wherein the percent conversion is 50% to 99.9%.

3. The method of claim 1 wherein said monomers are present in said solvent at a percent solids content of 50 wt. % to 90 wt. %.

4. The method of claim 1 wherein said neutralization of said carboxylic acid functionality is 40 mole % to 60 mole % for each mole of carboxylic acid.

5. The method of claim 1 wherein said neutralization of said carboxylic acid functionality is 45 mole % to 55 mole % for each mole of carboxylic acid.

6. The method of claim 1 wherein said polymerization provides a polymer with a weight average molecular weight (Mw) of at or above 20,000 g/mole.

7. The method of claim 1 wherein said polymerization provides a polymer with a weight average molecular weight (Mw) of 20,000 to 1,000,000 g/mole.

8. The method of claim 1 wherein said polymerization provides a polymer which indicates $^{13}C$ NMR triads having a syndiotacticity of greater than 58.0%.

9. The method of claim 1 wherein said partial neutralization takes place over a time period not to exceed 2.0 hours.

10. The method of claim 1 wherein said partial neutralization takes place over a time period not to exceed 1.0 hour.

11. The method of claim 1 wherein said polymerization is initiated by a free radical initiator wherein said initiator is present at a level of 0.05 wt. % to 15.0 wt. %.

12. The method of claim 1 wherein said polymerization is initiated by a free radical initiator wherein said initiator is present at a level of 0.1 wt. % to 6.0 wt. %.

13. The method of claim 1 wherein said polymerization is initiated by a free radical initiator wherein said initiator is present at a level of 0.20 wt. % to 4.0 wt. %.

14. The method of claim 1 wherein said monomer is itaconic acid.

15. The method of claim 1 wherein said monomers are capable of isomerization to non-polymerizing monomers, wherein the level of non-polymerizing monomer is maintained at a level of less than or equal to 20.0 mole percent for each mole of acidic monomer present.

16. The method of claim 1 wherein said polymerization is run continuously.

17. A method of forming a detergent comprising:
supplying polymerized monomer, wherein the polymerized monomer is sourced from a monomer having the following structure:

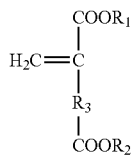

wherein $R_1$ and $R_2$ are selected from a hydrogen atom or an alkyl group or an aromatic group, or a cyclic alkyl group or a polyether, and combinations thereof and $R_3$ is selected from an alkyl group, aromatic functionality, heteroaromatic functionality, cyclic alkyl group, heterocylic group, or combinations thereof, wherein at least 50 mole % of $R_1$ and $R_2$ are a hydrogen atom to provide carboxylic acid functionality;
combining said monomer with a solvent and partially neutralizing the carboxylic acid functionality at a level of 25.0 mole % to 85.0 mole % for each mole of carboxylic acid functionality present, wherein said partial neutralization takes place over a time period not to exceed 6.0 hours and at a temperature of 50.0° C. to 150° C.;
polymerizing said monomer wherein the percent conversion of one of said monomers to polymer is at or above 50.0%; and
combining the polymerized monomer as a component into a detergent to provide a detergent formulation.

18. The method of claim 17 wherein the percent conversion is 50% to 99.9%.

19. The method of claim 17 wherein said monomer is present in said solvent at a percent solids content of 50 wt. % to 90 wt. %.

20. The method of claim 17 wherein said neutralization of said carboxylic acid functionality is 40 mole % to 60 mole % for each mole of carboxylic acid.

21. The method of claim 17 wherein said neutralization of said carboxylic acid functionality is 45 mole % to 55 mole % for each mole of carboxylic acid.

22. The method of claim 17 wherein said polymerization provides a polymer with a weight average molecular weight (Mw) of at or above 20,000 g/mole.

23. The method of claim 17 wherein said polymerization provides a polymer with a weight average molecular weight (Mw) of 20,000 to 1,000,000 g/mole.

24. The method of claim 17 wherein said polymerization provides a polymer which indicates $^{13}$C NMR triads having a syndiotacticity of greater than 58.0%.

25. The method of claim 17 wherein said partial neutralization takes place over a time period not to exceed 2.0 hours.

26. The method of claim 17 wherein said partial neutralization takes place over a time period not to exceed 1.0 hour.

27. The method of claim 17 wherein said polymerization is initiated by a free radical initiator wherein said initiator is present at a level of 0.05 wt. % to 15.0 wt. %.

28. The method of claim 17 wherein said polymerization is initiated by a free radical initiator wherein said initiator is present at a level of 0.1 wt. % to 6.0 wt. %.

29. The method of claim 17 wherein said polymerization is initiated by a free radical initiator wherein said initiator is present at a level of 0.20 wt. % to 4.0 wt. %.

30. The method of claim 17 wherein said monomer is itaconic acid.

31. The method of claim 17 wherein said monomer is capable of isomerization to non-polymerizing monomers, wherein the level of non-polymerizing monomer is maintained at a level of less than or equal to 20.0 mole percent for each mole of acidic monomer present.

32. The method of claim 17 wherein said polymerization is run continuously.

* * * * *

UNITED STATES PATENT AND TRADEMARK OFFICE
CERTIFICATE OF CORRECTION

| | | |
|---|---|---|
| PATENT NO. | : 7,910,677 B2 | Page 1 of 1 |
| APPLICATION NO. | : 12/570447 | |
| DATED | : March 22, 2011 | |
| INVENTOR(S) | : Durant et al. | |

It is certified that error appears in the above-identified patent and that said Letters Patent is hereby corrected as shown below:

On the Title Page, in Item (73), in Assignee, in column 1, line 2 delete "NJ (US)" and insert -- NH (US) --, therefor.

In column 18, line 13, in Claim 1, delete "heterocylic" and insert -- heterocyclic --, therefor.

In column 19, line 22, in Claim 17, delete "heterocylic" and insert -- heterocyclic --, therefor.

Signed and Sealed this
Fourteenth Day of June, 2011

David J. Kappos
*Director of the United States Patent and Trademark Office*